(12) United States Patent
Junghans

(10) Patent No.: US 6,259,710 B1
(45) Date of Patent: Jul. 10, 2001

(54) SYSTEM FOR INTELLIGENT C-PLANE SWITCHING IN THE DIGITAL ENHANCED CORDLESS TELECOMMUNICATIONS SYSTEM

(75) Inventor: Andreas Junghans, Hallbergmoos (DE)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/088,939

(22) Filed: Jun. 2, 1998

(51) Int. Cl.$^7$ ........................................... H04J 3/12
(52) U.S. Cl. ............................. 370/522; 370/528
(58) Field of Search ........................ 370/528, 522

(56) References Cited

U.S. PATENT DOCUMENTS

| | | | |
|---|---|---|---|
| 4,864,566 | * | 9/1989 | Chauveau ............................. 370/109 |
| 5,121,385 | * | 6/1992 | Tominaga et al. ....................... 370/80 |
| 5,265,096 | * | 11/1993 | Parruck .............................. 370/110.1 |
| 5,650,825 | * | 7/1997 | Naimpally et al. .................... 348/465 |
| 5,953,418 | * | 9/1999 | Bock et al. ............................ 380/20 |
| 6,134,249 | * | 10/2000 | Nakao ................................. 370/528 |

* cited by examiner

Primary Examiner—Hassan Kizou
Assistant Examiner—Thien Tran
(74) Attorney, Agent, or Firm—Wagner, Murabito & Hao LLP

(57) ABSTRACT

A system for intelligent C-plane switching in the digital enhanced cordless telecommunications (DECT) system. The present invention includes a system that enables fast C-plane transmission mode during cordless telephone voice connections within the digital enhanced cordless telecommunications (DECT) system without degrading the voice quality. In order to perform this fast C-plane transmission mode during voice connections, one embodiment of the present invention, located within a cordless telephone handset, utilizes a silence detector circuit to determine the periods of silence within the voice data transmitted through the U-plane. By determining the periods of silence within the U-plane voice data, the present invention is able to direct the control data to be transmitted through the fast C-plane during the periods of silence. As such, the control data are able to be transmitted within the fast C-plane transmission mode without degrading or disturbing the quality of the voice data transmitted through the U-plane. Therefore, the present invention improves the fast C-plane transmission mode during cordless telephone voice connections within the DECT system.

20 Claims, 14 Drawing Sheets

SYSTEM FOR INTELLIGENT C-PLANE SWITCHING IN THE DIGITAL ENHANCED CORDLESS TELECOMMUNICATIONS SYSTEM

TECHNICAL FIELD

The present invention relates to the field of wireless telecommunication. More specifically, the present invention relates to the digital enhanced cordless telecommunications (DECT) system.

BACKGROUND ART

Within the field of wireless telecommunications systems there exists a system referred to as the digital enhanced cordless telecommunications (DECT) system. Within the DECT system, a user of a cordless portable telephone handset is able to communicate with a user of another telecommunication device by way of a fixed base station utilizing wireless communication. To enable the cordless telephone handset and the base station to communicate within the DECT system, a radio interface is utilized.

Within the radio interface of the DECT system, there are two communication channels utilized during communication between a cordless telephone and a base station. One of the channels is commonly referred to as the slow C-plane and is used for transmitting control data at a maximum rate of 2 kilobits per second (kBit/s). This control data enable the communication devices to remain synchronized, among other things. The other channel is typically referred to as the U-plane and is used for transmitting user data, which can include either voice data produced by a user of a cordless telephone or digital data generated, for example, by a modem of a computer system. The voice data is transmitted through the U-plane at a rate of 32 kBit/s while the digital data is transmitted through at a rate of up to 80 kBit/s. It should be appreciated that the user data (U-plane data) and the control data (slow C-plane data) can be concurrently transmitted between a base station and a cordless telephone within the DECT system.

There are some situations (e.g., during the initial setup of a call) where the need arises to transfer control data at a faster data rate than is possible through the slow C-plane. As such, the DECT standard additionally defines a fast C-plane transmission mode which enables the transmission of control data at a data rate of either 25.6 kBit/s or 64 kBit/s. The fast C-plane transmission mode, as defined by the DECT standard, involves the U-plane and fast C-plane sharing the same field within the communication frames of the system. As such, during transmission of control data through the fast C-plane, user data cannot be transmitted through the U-plane. In other words, fast C-plane data and U-plane data cannot be transmitted concurrently. A typical prior art circuit for implementing and controlling the transmission of fast C-plane data and U-plane data is discussed below with reference to FIG. 1.

FIG. 1 is a block diagram of a prior art switching circuit 100 conventionally used within a cordless telephone of the DECT system for transmission of user data 102 through the U-plane and of control data 104 through the fast C-plane. As described above, user data (U-plane data) 102 and control data (fast C-plane data) 104 are not simultaneously transmitted. As such, switching circuit 100 is implemented to transmit either user data 102 or control data 104. Furthermore, switching circuit 100 is implemented to grant transmission priority to control data 104. For instance, when switching circuit 100 is transmitting user data 102 and it receives control data 104, the transmission of user data 102 is suspended in order to begin transmission of control data 104. Additionally, the transmission of user data 102 remains suspended until the transmission of the control data 104 is completed. The detailed manner in which switching circuit 100 operates is described below.

Switching circuit 100 of FIG. 1 is able to receive both user data 102 and control data 104. The received user data 102 are stored within a U-plane first-in first-out (FIFO) buffer memory 106, while the received control data 104 are stored within a C-plane FIFO buffer memory 108. An E/U-multiplexer (Mux) 112, as defined within the DECT standard, receives both the user data 102 output from U-plane buffer 106 and the control data 104 output from C-plane buffer 108. It should be appreciated that the function of E/U-Mux 112 is to transfer either the user data 102 or the control data 104 into a DECT channel buffer 114. C-plane buffer 108 controls the operation of E/U-Mux 112 by asserting or de-asserting a signal 110. For instance, upon receiving control data 104, C-plane buffer 108 asserts signal 110, causing E/U-Mux 112 to transfer control data 104 into DECT channel buffer 114. Conversely, if there are no control data 104 within C-plane buffer 108, it de-asserts signal 110, causing E/U-Mux 112 to transfer user data 102 into DECT channel buffer 114. In this manner, transmission priority is granted to control data 104.

The function of DECT channel buffer 114 of FIG. 1 is to encode whichever it receives of the user data 102 or the control data 104 to be transmitted in a time division multiple access (TDMA) format. Then DECT channel buffer 114 either outputs user data 102 through the U-plane as an air channel data stream 116. Or DECT channel buffer 114 outputs control data 104 in the fast C-plane transmission mode as an air channel data stream 116.

There is a disadvantage associated with the prior art fast C-plane transmission mode described above with reference to switching circuit 100 of FIG. 1. The disadvantage occurs during voice connections wherein the fast C-plane transmission mode noticeably degrades the quality of the voice signals of a user of a cordless telephone within the DECT system. This degradation in voice signal quality is caused by the suspension of the transmission of U-plane voice data in order to transmit fast C-plane data. Consequently, this results in a gap within the voice signal data stream.

Thus, what is desired is a system which enables the fast C-plane transmission mode to be utilized during cordless telephone voice connections within the DECT system without degrading or disturbing the quality of the voice signals. The present invention provides this advantage.

DISCLOSURE OF THE INVENTION

The present invention includes a system that enables fast C-plane transmission mode during cordless telephone voice connections within the digital enhanced cordless telecommunications (DECT) system without degrading the voice quality. In order to perform this fast C-plane transmission mode during voice connections, one embodiment of the present invention, located within a cordless telephone handset, utilizes a silence detector circuit to determine the periods of silence within the voice data transmitted through the U-plane. By determining the periods of silence within the U-plane voice data, the present invention is able to direct the control data to be transmitted through the fast C-plane during the periods of silence. As such, the control data are able to be transmitted within the fast C-plane transmission mode without degrading or disturbing the quality of the voice data transmitted through the U-plane. Therefore, the present invention improves the fast C-plane transmission mode during cordless telephone voice connections within the DECT system.

Specifically, one embodiment of the present invention is a fast C-plane transmission mode switching circuit utilized within a cordless telephone handset of a DECT system. The switching circuit includes a first buffer device that is coupled to receive and store control data utilized within the DECT system. Furthermore, the switching circuit includes a second buffer device that is coupled to receive and store user data which is also utilized within the DECT system. A multiplexer circuit is coupled to the outputs of the first and second buffer devices in order to output the control data or the user data. A silence detector circuit is also coupled to receive the user data, and it generates an output signal when a period of silence is detected within the user data. The output signal from the silence detector circuit controls whether the multiplexer circuit outputs a portion of the control data or a portion of the user data.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a system for enabling fast C-plane transmission mode during voice connections within the digital enhanced cordless telecommunications (DECT) system without degrading the voice quality, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention operates within the DECT system which provides wireless voice communication for its users. In addition to providing its users with wireless voice communication, the DECT system also provides digital data communication capabilities (e.g., computer modem communication). The DECT system has the ability to operate both indoors and outdoors, which offers greater communication opportunities. For instance, the indoor operations include using it within homes, office spaces, and hotels, whereas the outdoor operations of the DECT system include using it within suburban and city areas. The DECT system specification is well known by those skilled in the art.

Figure 1:
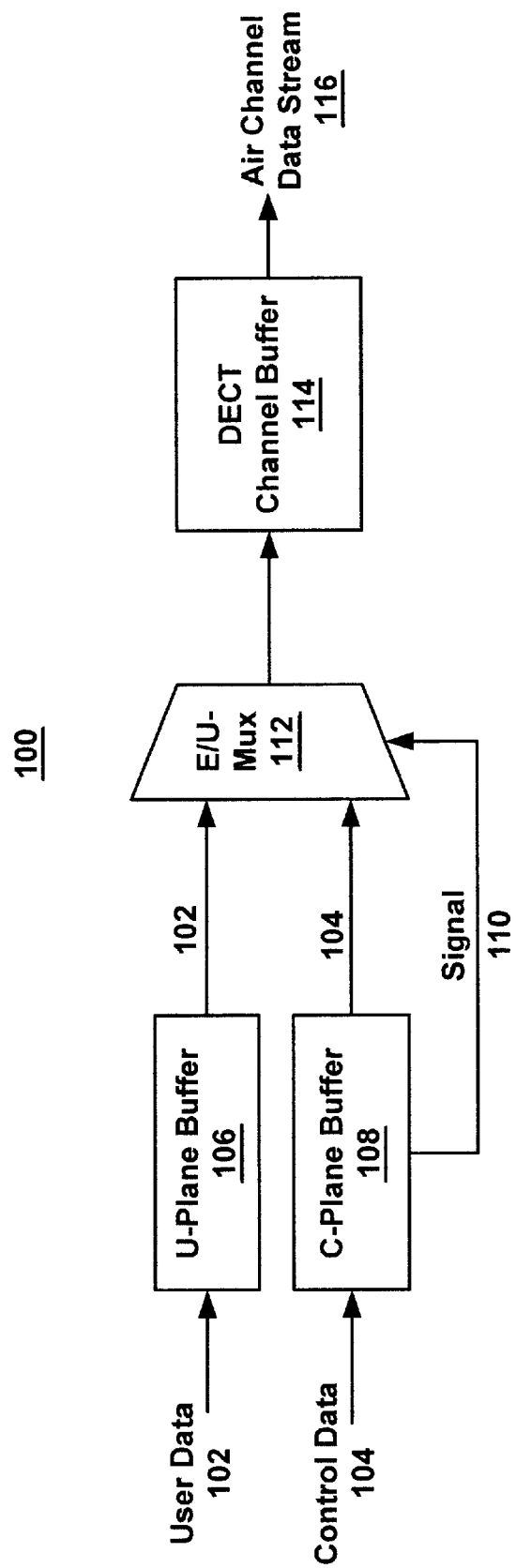
FIG. 1 is a block diagram of a prior art switching circuit conventionally used within a cordless telephone of the DECT system for transmission of user data through the U-plane and control data through the fast C-plane.
Figure 2:
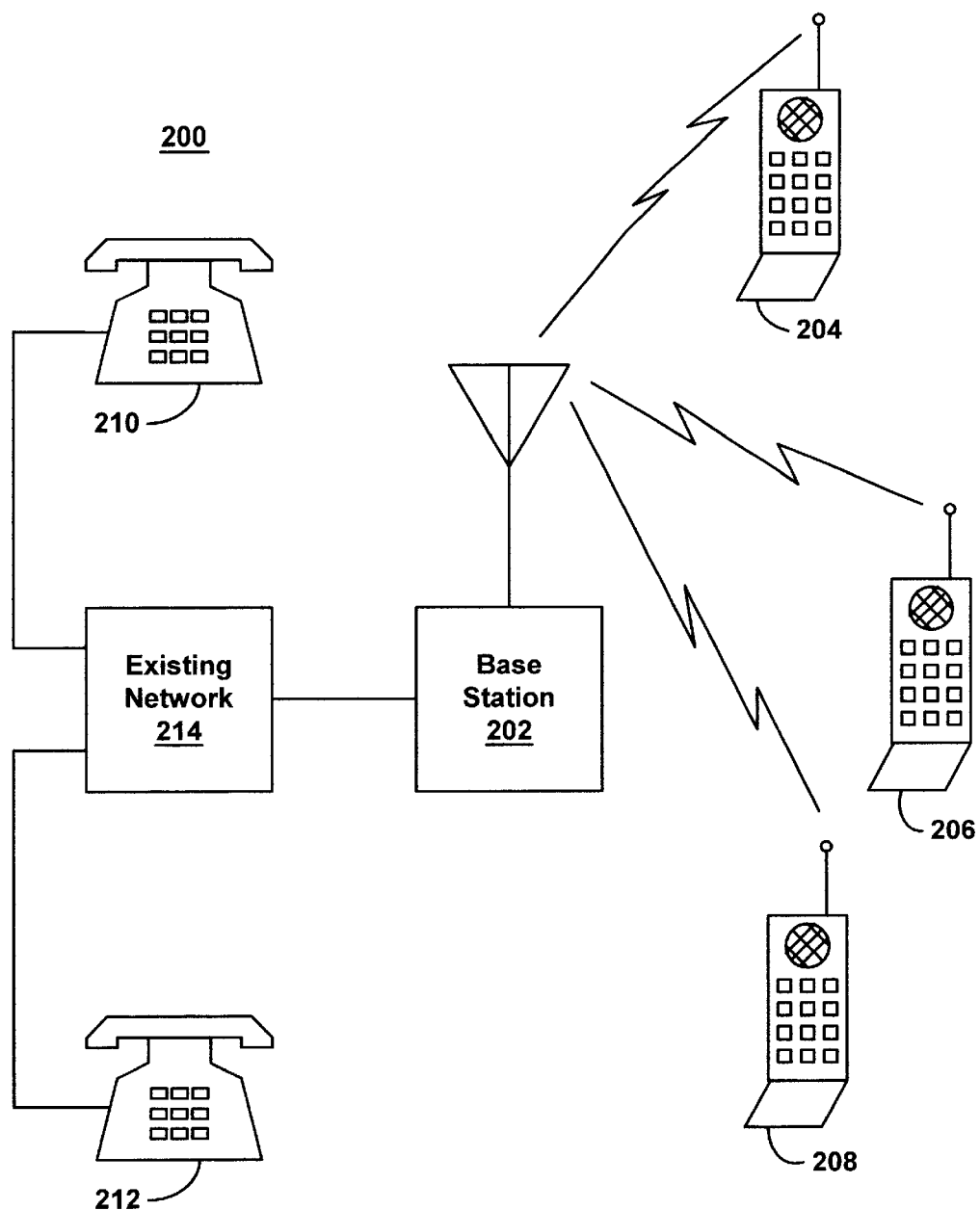
FIG. 2 is a general overview of the DECT system in which the present invention operates.

FIG. 2 illustrates a general overview of a DECT system 200 in which the present invention operates. The two main transmitter/receiver components that comprise DECT system 200 are a base station and a cordless telephone handset. The peripheral circuitry of the present invention is implemented within the internal circuitry of the cordless telephone handset. Cordless telephone handsets 204–208 have the ability to transmit and receive voice information along with other types of data. Base station 202 is a fixed transmitter/receiver station which can be implemented by coupling it into an existing public telephone network 214. Implemented in this manner, base station 202 enables the users of cordless telephone handsets 204–208 to communicate with each other and with the users of land line-based telephones 210 and 212 which are coupled by wire to the existing public telephone network 214. The information (e.g., sound/voice data) that is communicated between base station 202 and cordless telephone handsets 204–208 in DECT system 200 is the same type of information that can normally be transferred and received over a public telephone wire network system. But instead of communicating over a wire network, the DECT system uses a wireless digital radio interface to communicate information between base station 202 and cordless telephone handsets 204–208. One present invention embodiment of the digital radio interface used by DECT system 200 is a time division multiple access capability with time division duplexing (TDMA-TDD).

Within DECT system 200 of FIG. 2 there are some situations (e.g., during the initial setup of a call) where the need arises to transfer control data at a faster data rate than is possible through the slow C-plane, as described above. As such, the DECT standard defines a fast C-plane transmission mode enabling the transmission of control data at a data rate of either 25.6 kBit/s or 64 kBit/s. The fast C-plane transmission mode, as defined within the DECT standard, involves the fast C-plane and U-plane sharing the same field within the communication frames of DECT system 200. As such, during transmission of control data through the fast C-plane, user data cannot be transmitted through the U-plane. In other words, fast C-plane data and U-plane data cannot be transmitted concurrently.

Figure 3:
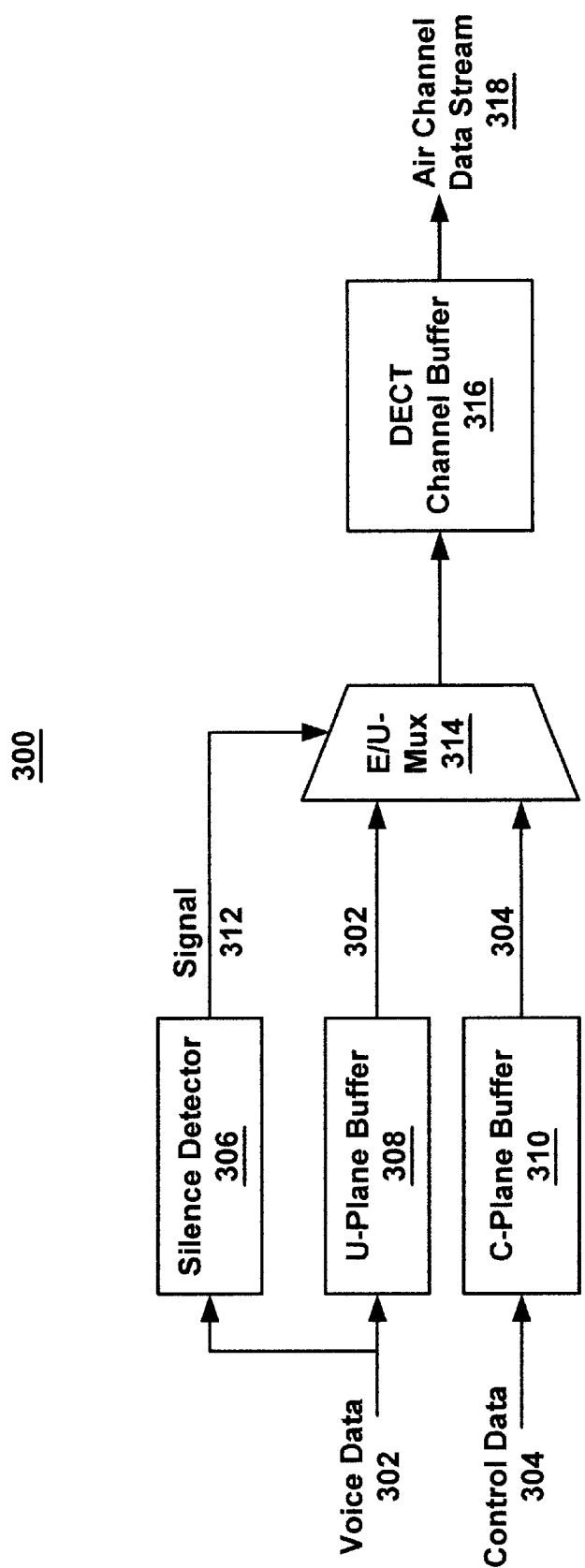
FIG. 3 is a block diagram of one embodiment of a circuit in accordance with the present invention for enabling fast C-plane transmission mode during cordless telephone voice connections within the DECT system without degrading the voice quality.

The present invention includes a system that enables fast C-plane transmission mode during cordless telephone voice connections within DECT system 200 of FIG. 2 without degrading the voice quality. As shown in FIG. 3, in order to perform this fast C-plane transmission mode during voice connections, one embodiment of the present invention is located within a cordless telephone handset (e.g., 204) and utilizes a silence detector circuit 306 to determine the periods of silence within voice data 302 transmitted through the U-plane. By determining the periods of silence within the U-plane voice data 302, the present invention is able to direct the control data 304 to be transmitted through the fast C-plane during the periods of silence. As such, control data 304 are able to be transmitted within the fast C-plane transmission mode without degrading or disturbing the quality of voice data 302 transmitted through the U-plane. Therefore, the present invention improves the fast C-plane transmission mode during cordless telephone voice connections within DECT system 200.

Specifically, circuit 300 of FIG. 3 is able to receive both control data (fast C-plane data) 304 and voice data (U-plane voice data) 302. The received control data 304 is stored within a C-plane first-in first-out (FIFO) buffer memory 310, while the received voice data 302 is stored within a U-plane FIFO buffer memory 308. Furthermore, the received voice data 302 is also received by silence detector circuit 306. An E/U-multiplexer (Mux) 314, as defined within the DECT standard, receives both voice data 302 output from U-plane buffer 308 and control data 304 output from C-plane buffer 310. It should be appreciated that the function of E/U-Mux 314 is to transfer either voice data 302 or the control data 304 into a DECT channel buffer 316.

Silence detector circuit 306 of FIG. 3 determines the periods of silence within voice data 302 (e.g., when a user of cordless telephone 204 is not speaking). One embodiment of silence detector 306 in accordance with the present invention recognizes only a period of silence within voice data 302 which has a duration of at least 10 milliseconds (ms). It should be appreciated that the definition of a period of silence, in accordance with the present invention, can be any specific duration of silence greater than or less than 10 ms. Furthermore, one embodiment of silence detector 306, in accordance with the present invention, is part of an echo canceller unit (not shown) within DECT system 200.

Silence detector circuit 306 of FIG. 3 determines the periods of silence within voice data 302, as described above, and then controls the operation of E/U-Mux 314 by asserting or de-asserting a signal 312. For instance, upon detecting a period of silence within voice data 302, silence detector 306 asserts signal 312 for the duration of the period of silence which causes E/U-Mux 314 to transfer a portion of control data 304 into DECT channel buffer 316. In this manner, silence detector 306 directs E/U-Mux 314 to transfer control data 304 into DECT channel buffer 316 for the duration of the detected period of silence. Conversely, silence detector 306 de-asserts signal 312 during the non-silent periods within voice data 302, which causes E/U-Mux 314 to transfer voice data 302 into DECT channel buffer 316. In this fashion the transmission order of voice data 302 and control data 304 is established, wherein control data 304 will be transmitted during the periods of silence within voice data 302.

The purpose of DECT channel buffer 316 of FIG. 3 is to encode the data that it receives to be transmitted in a time division multiple access (TDMA) format. As such, DECT channel buffer 316 encodes voice data 302 for transmission and then outputs it through the U-plane as part of an air channel data stream 318. Moreover, DECT channel buffer 316 encodes control data 304 for transmission and then outputs it through the fast C-plane as part of air channel data stream 318. In accordance with one embodiment of the present invention, as long as the fast C-plane transmission is ongoing, the receiving side of the voice connection (e.g., cordless telephone 206 of FIG. 2) generates silence locally in order to substitute for the missing periods of silence within the received voice data 302.

It should be appreciated that circuit 300 of FIG. 3 is not limited to voice connections; it is also suitable for data services within the U-plane. In that case, control data 304 is transmitted in the fast C-plane transmission mode when silence detector 306 detects an idle-pattern within the user data of at least 10 ms. As such, the present invention is well suited to receive and transmit any type of user data through the U-plane, including voice and digital data.

Additionally, it should be appreciated that circuit 300 of FIG. 3 can be used for a DECT system connected to a integrated services digital network (ISDN). Specifically, the present invention can be used for DECT/ISDN intermediate or end system configurations, which are familiar to those of ordinary skill in the art. Within these type of systems, one embodiment in accordance with the present invention can be used for fast call up before or during active voice connections without disturbing the voice quality of the user data.

Furthermore, circuit 300 of FIG. 3 can be also used for ISDN control channel (D-channel) data transmission (e.g., x.25 protocol) during ISDN voice connections, which is familiar to those of ordinary skill in the art. The D-channel data can be transferred during silence periods within the bearer channels (B-channel), which carries voice signals. The present invention is applicable for all packet oriented D-channel data transfer protocols.

Figure 4A:
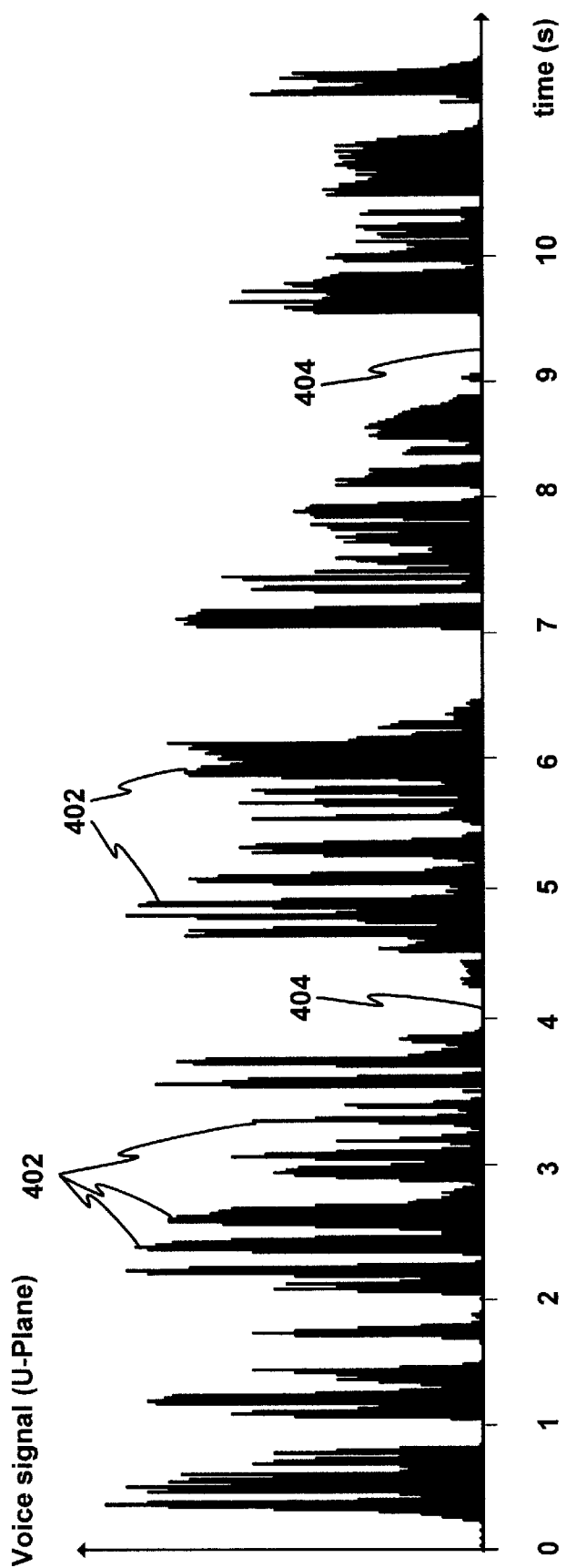
FIG. 4A is a graph representing typical voice data which is transmitted through the U-plane in accordance with the present invention.
Figure 4B:
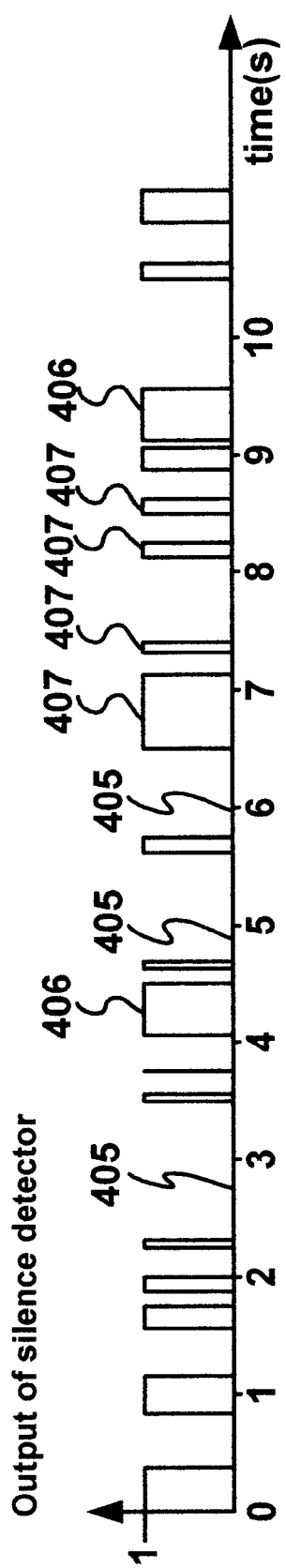
FIG. 4B is a graph representing output signals of one embodiment of a silence detector as it detects periods of silence within the voice data of FIG. 4A in accordance with the present invention.
Figure 4C:
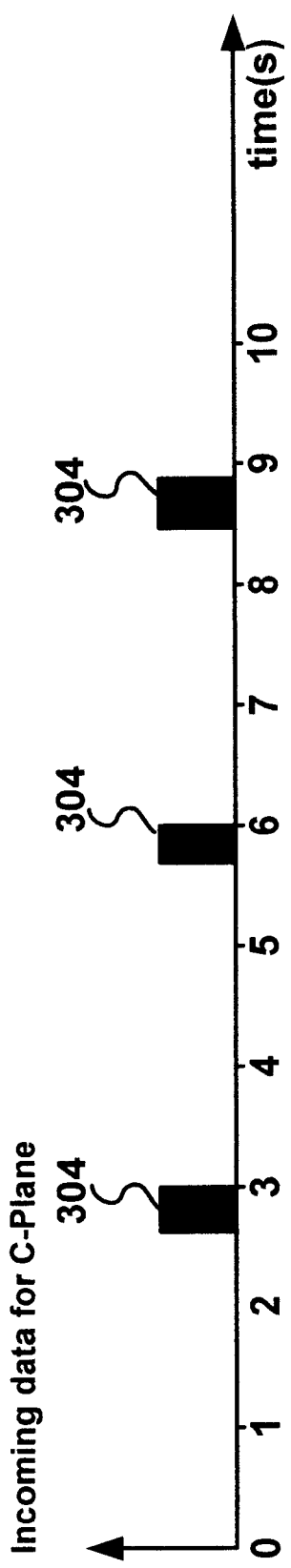
FIG. 4C is a graph representing typical control data received by one embodiment of a C-plane buffer in accordance with the present invention.
Figure 4D:
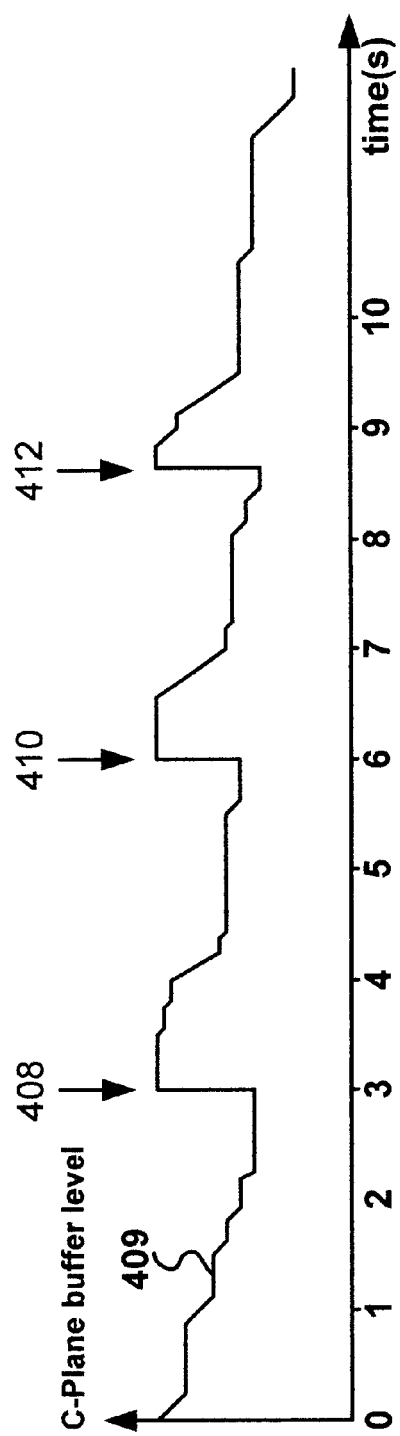
FIG. 4D is a graph representing the amount of control data located within a C-plane buffer as it receives and outputs control data in accordance with the present invention.
Figure 4E:
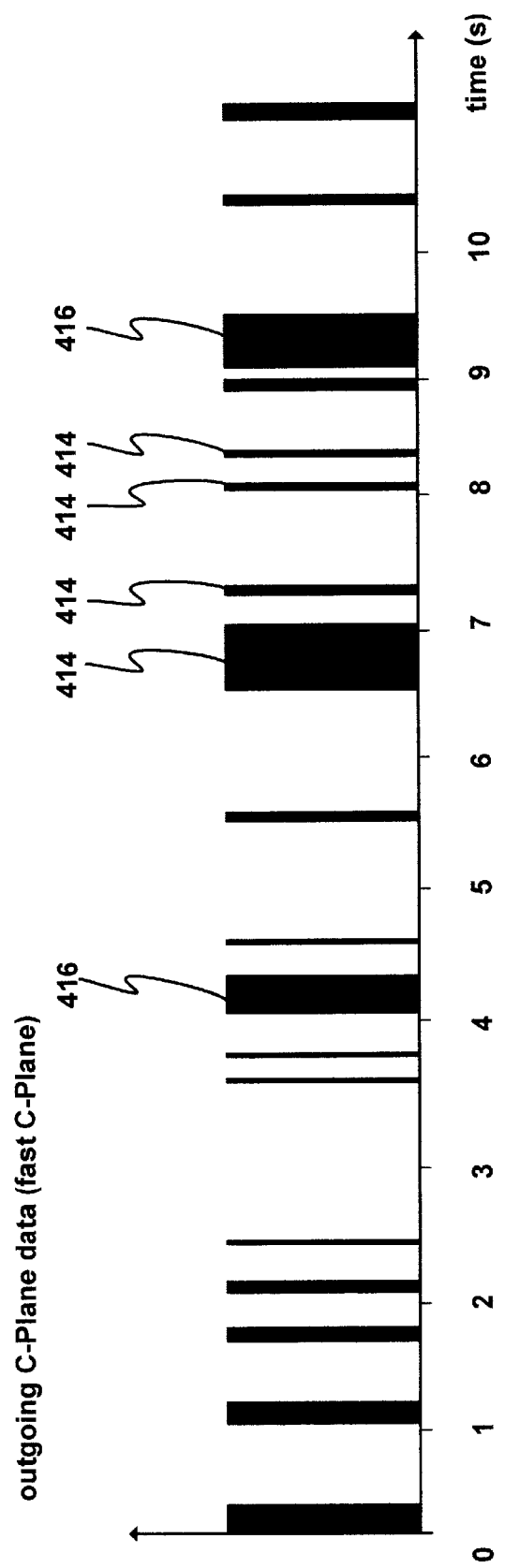
FIG. 4E is a graph representing the amount of control data output by a C-plane buffer during the silent periods of the voice data of FIG. 4A in accordance with the present invention.
Figure 4F:
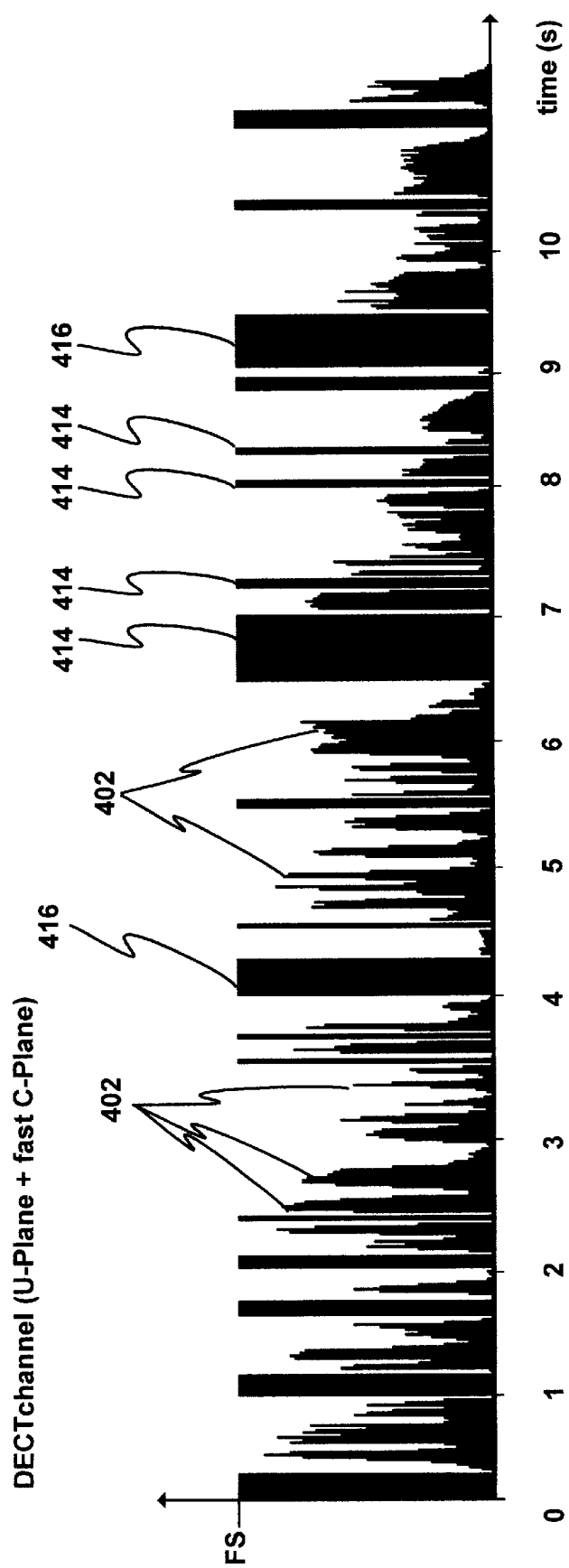
FIG. 4F is a graph representing the data stream output from a cordless telephone in accordance with the present invention in which the fast C-plane control data is transmitted during the periods of silence of the U-plane voice data.

FIGS. 4A–4F are discussed in conjunction with circuit 300 of FIG. 3 in order to understand the present invention more thoroughly. It should be appreciated that all of the horizontal axes of FIGS. 4A–4F represent time from zero to ten seconds, and beyond. Specifically, FIG. 4A is a graph that represents voice data 302 of FIG. 3, which is received over time by U-plane buffer 308 and silence detector 306, while FIG. 4B is a graph representing the assertion and de-assertion of signal 312 over time by silence detector 306. Furthermore, FIG. 4C is a graph representing control data 304 which is received by C-plane buffer 310 over time, while FIG. 4D is a graph representing the amount of control data 304 stored within C-plane buffer 310 over time. Additionally, FIG. 4E is a graph representing the amount of control data 304 that is output over time from C-plane buffer 310 during the silence periods represented in FIG. 4B. Moreover, FIG. 4F is a graph representing air channel data stream 318 which is output over time by circuit 300 with control data 304 transmitted during the periods of silence of the voice data 302 transmission.

FIG. 4A is a graph representing voice data 302 of FIG. 3 that is received over time by U-plane buffer 308 and silence detector 306 in accordance with the present invention. The vertical axis of FIG. 4A represents the amplitude of voice data 302. As such, peaks 402 of voice data 302 represent loud speech, while valleys 404 represent periods of silence within voice data 302.

FIG. 4B is a graph representing the assertion and de-assertion of signals 312 by silence detector 306 over time in accordance with the present invention as it detects periods of silence within voice data 302 of FIG. 4A. The vertical axis of FIG. 4B represents the magnitude of signal 312 indicating whether it has been asserted or de-asserted. As such, blocks 406 and 407 represent when signal 312 is asserted, while regions 405 represent when signal 312 is de-asserted. It should be appreciated that signal 312 is asserted at blocks 406, which correspond to valleys 404 of FIG. 4A. Furthermore, signal 312 is de-asserted at regions 405, which correspond to peaks 402 of FIG. 4A.

FIG. 4C is a graph representing control data 304 which is received by C-plane buffer 310 over time in accordance with the present invention. The vertical axis of FIG. 4C represents the magnitude of received control data 304. It should be appreciated that control data 304 are not a continuous data stream, but instead are data packets. FIG. 4C represents control data 304 randomly arriving at C-plane buffer 310.

FIG. 4D is a graph representing the amount of control data 304 stored over time within C-plane buffer 310 as it receives and outputs control data 304 in accordance with the present invention. The vertical axis of FIG. 4D represents the amount of control data 304 located within C-plane buffer 310. It should be appreciated that line 409, which represents the amount of control data 304 within C-plane buffer 310, drastically rises at arrows 408–412. The rises in line 409 correspond to the reception of control data 304 by C-plane buffer 310 as represented in FIG. 4C.

FIG. 4E is a graph representing the amount of fast C-plane data 304 that is output over time from C-plane buffer 310 during the silence periods shown in FIG. 4B, in accordance with the present invention. The vertical axis of FIG. 4E represents the amount of control data 304 output by C-plane buffer 310. It should be appreciated that each time a block 414 appears within FIG. 4E, line 409 of FIG. 4D declines, indicating less control data 304 stored within C-plane buffer 310. It should be further appreciated that blocks 414 and 416 of FIG. 4E directly correspond to blocks 407 and 406 of FIG. 4B, respectively. This correspondence indicates that control data 304 is output from C-plane buffer 310 during the periods of silence detected by silence detector 306, in accordance with the present invention.

FIG. 4F is a graph representing air channel data stream 318 which is output over time from DECT channel buffer 316 with control data 304 transmitted during the periods of silence of voice data 302 transmission. The vertical axis of FIG. 4F represents the amplitude of the transmission signal up to the full scale (FS) of the voice range. It should be appreciated that blocks 414 and 416 of FIG. 4F directly correspond to blocks 414 and 416 of FIG. 4E, respectively.

It should be further appreciated that peaks 402 of FIG. 4F directly correspond to peaks 402 of FIG. 4A. Therefore, the present invention transmits control data 304 during the periods of silence of the voice data 302 transmission.

Figure 5:
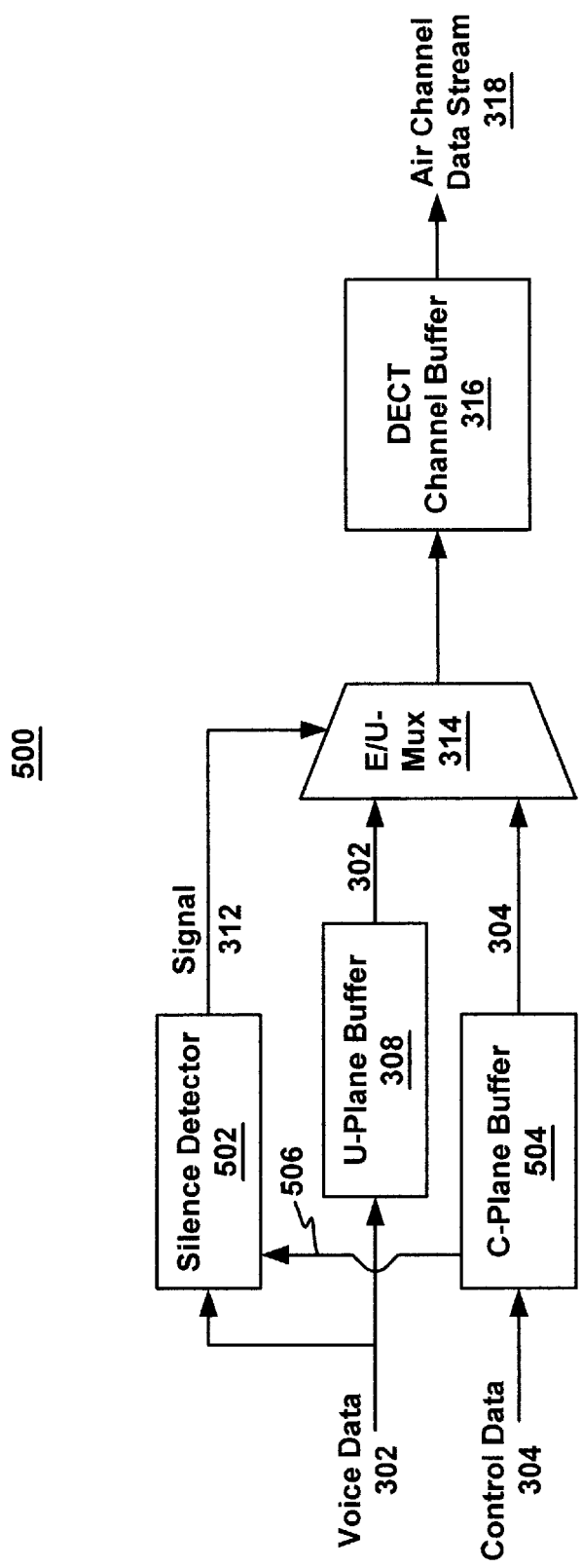
FIG. 5 is a block diagram of another embodiment of a circuit enabling fast C-plane transmission mode during cordless telephone voice connections within the DECT system in accordance with the present invention.

FIG. 5 is a block diagram of a circuit 500 as another embodiment for enabling fast C-plane transmission mode during cordless telephone voice connections within the DECT system 200 of FIG. 2 in accordance with the present invention. It should be appreciated that circuit 500 is very similar to circuit 300 of FIG. 3. As such, circuit 500 operates in almost the same manner as circuit 300. The main difference between circuit 500 and circuit 300 is that the operation of silence detector 502 of circuit 500 is dependent on the amount of control data 304 stored within C-plane buffer 504, while silence detector 306 of circuit 300 is not. The reason for causing silence detector 502 to operate in this manner is to restrict C-plane buffer 504 from exceeding its operational storage capacity or some other predetermined limit.

Figure 6:
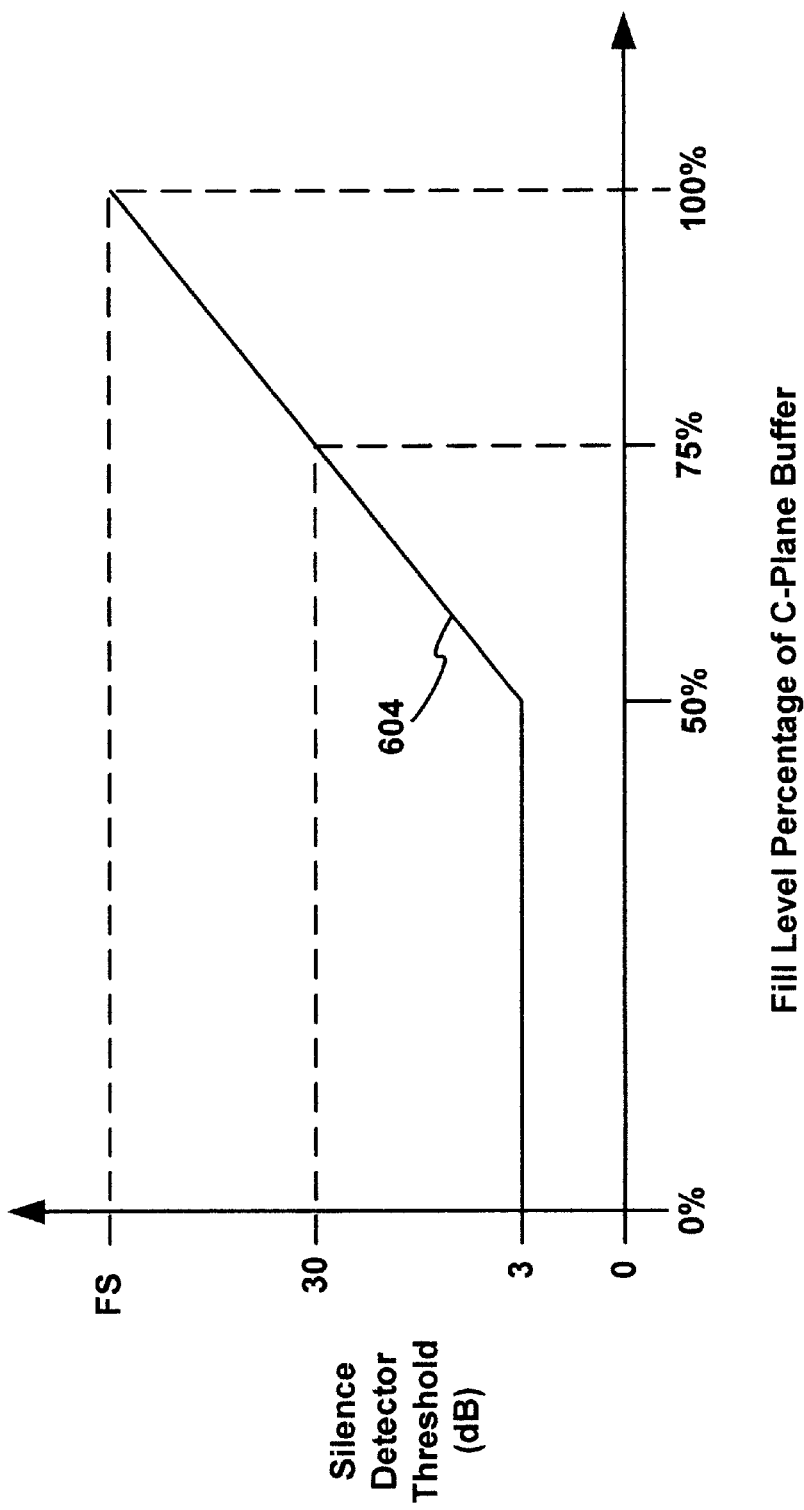
FIG. 6 is a graph representing the manner in which one embodiment of a silence detector operates in accordance with the present invention.

Specifically, silence detector 502 of FIG. 5 has an adjustable threshold of silence which directly corresponds to the amount of control data 304 stored within C-plane buffer 504. It should be appreciated that the present invention is well suited for many different types of functions for adjusting the threshold of silence within the silence detector 502. For example, FIG. 6 is a graph representing one embodiment of an adjustable threshold of silence function 604 which is implemented within silence detector 504 in accordance with the present invention. The horizontal axis of FIG. 6 represents the percentage of storage capacity that is occupied within C-plane buffer 504 while the vertical axis represents the threshold level of what is considered to be silence by silence detector 502. It should be appreciated that C-plane buffer 504 outputs a signal 506, indicating its percentage of filled storage capacity to silence detector 502. The threshold level which silence detector 502 considers silence is dependent on the value of signal 506.

For example, when the amount of control data 304 stored within C-plane buffer 504 occupies 50% or less of its storage capacity, silence detector 502 considers any voice data 302 between 0 and 3 decibels (dB) to be silence. When the amount of control data 304 stored within C-plane buffer 504 occupies more than 50% of its storage capacity, silence detector 502 considers any voice data 302 between a larger range of decibels to be silence. This range of decibels can extend up to the full scale (FS) of the human voice range (e.g., 78 dB), which is the full amplitude of voice data 302. For instance, if the amount of control data 304 stored within C-plane buffer occupies 75% of its storage capacity, silence detector 502 considers any voice data 302 between 0 and 30 dB to be silence. As such, control data 304 will typically be output more quickly from C-plane buffer 504, resulting in more frequent transmission suspension of voice data 302 through the U-plane. Hence, the quality of voice data 302 will progressively be degraded as the percentage of storage capacity that is occupied within C-plane buffer 504 increases. It should be appreciated that as more control data 304 is output by C-plane buffer 504, the amount of control data 304 stored within it typically decreases. As a result, silence detector 502 will consider any voice data 302 between a smaller range of decibels to be silence, which will improve the quality of voice data 302 transmitted through the U-plane.

Figure 7:
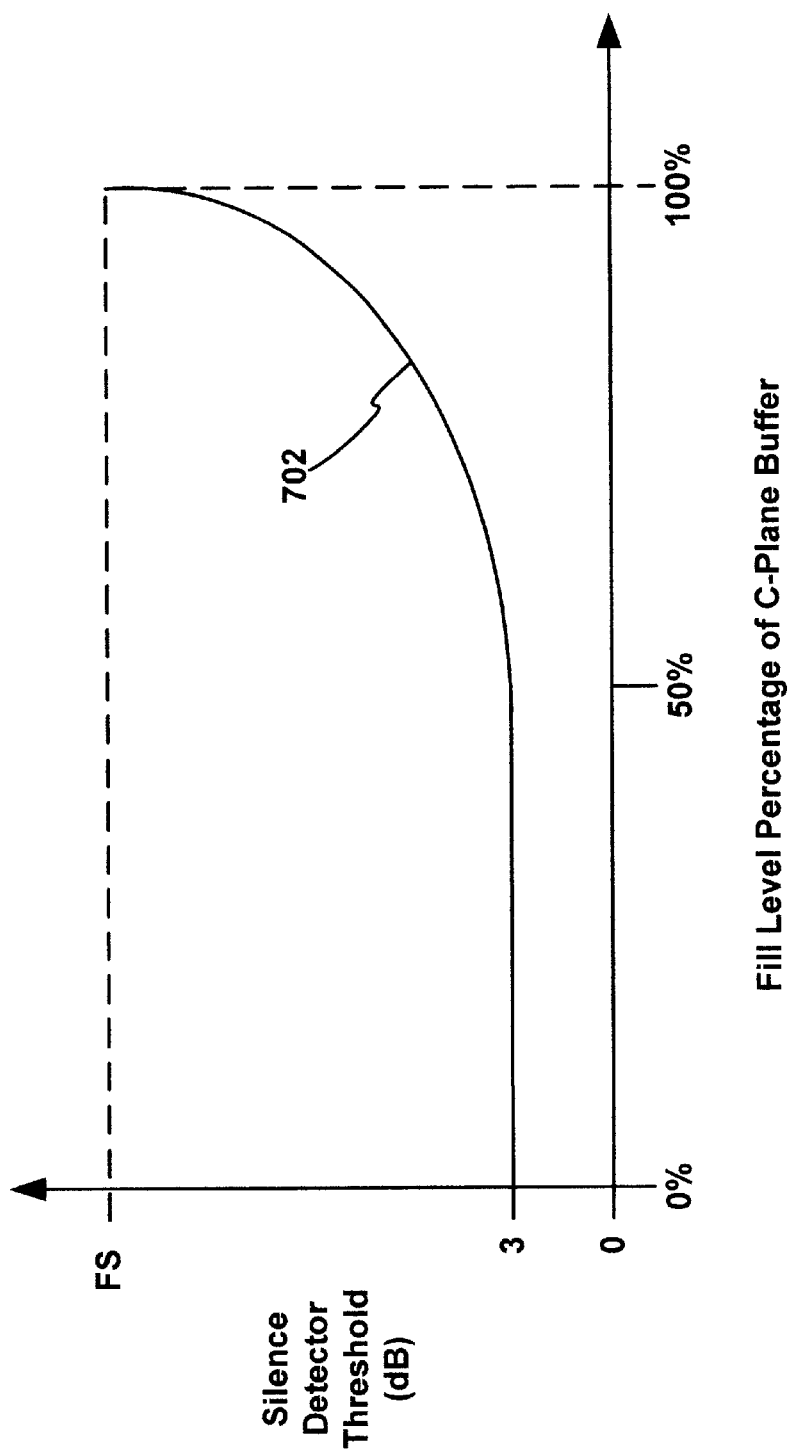
FIG. 7 is a graph representing the manner in which another embodiment of a silence detector operates in accordance with the present invention.

FIG. 7 is a graph representing another embodiment of an adjustable threshold of silence function 702 which is implemented within silence detector 504 in accordance with the present invention. The vertical and horizontal axes of FIG. 7 are the same as those of FIG. 6. The only difference between function 702 and function 604 of FIG. 6 is that the slope increase of function 702 initially is more gradual than function 604. But as function 702 approaches the 100% fill level of C-plane buffer 504, the slope of function 702 increases much faster than that of function 604. It should be appreciated that the point at which the increase of the threshold level of silence begins (e.g., 50%) is arbitrary and can be established at any specific level in accordance with the present invention. The specific level can, for example, be established depending on the dynamic behavior of how control data 304 is being transmitted (e.g., in huge data bursts or in small steady packets of data).

Figure 8:
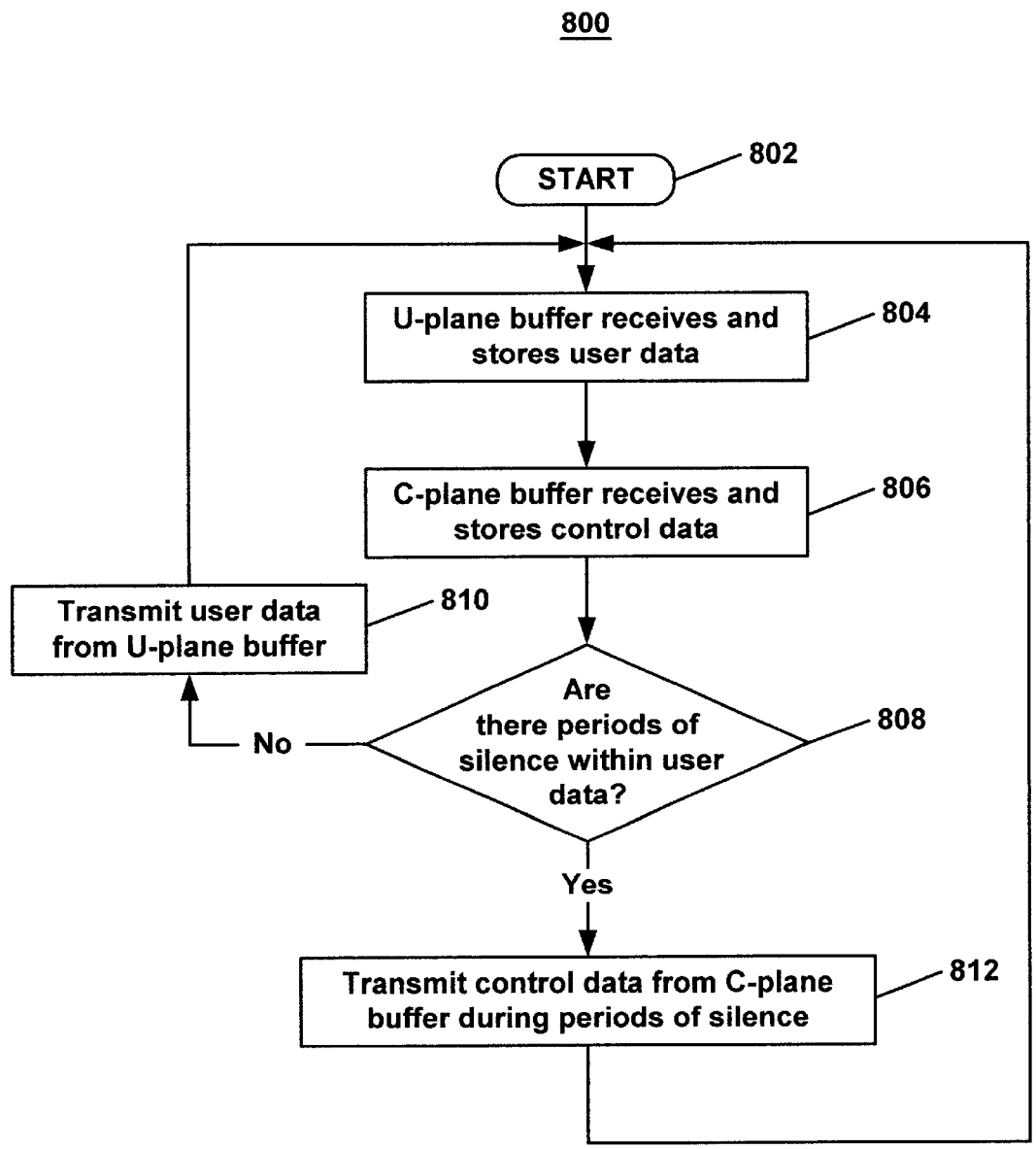
FIG. 8 is a flowchart of a method for enabling fast C-plane transmission mode during cordless telephone voice connections within the DECT system without degrading the voice quality in accordance with one embodiment of the present invention.

FIG. 8 is a flowchart of a method 800 in accordance with one embodiment of the present invention for enabling fast C-plane transmission mode during cordless telephone voice connections within the DECT system without degrading the voice quality. Process 800 starts at step 802 and proceeds to step 804. Within step 804, user data of the DECT system is received and stored within a U-plane buffer memory device. It should be appreciated that user data with the DECT system includes both voice and digital data.

During step 806 of FIG. 8, control data utilized within the DECT system is received and stored within a C-plane buffer memory device. It should be appreciated that control data within the DECT system is utilized to synchronize the communication channels, among other things. It should further be appreciated that the order in which steps 804 and 806 of process 800 are performed is interchangeable.

Within step 808 of FIG. 8, a silence detector circuit determines if there are any periods of silence within the user data stored within the U-plane buffer. During step 808, if there are not periods of silence within the user data, process 800 proceeds to step 810. If there are periods of silence within the user data during step 808, process 800 proceeds to step 812.

During step 810 of FIG. 8, a multiplexer transmits the user data stored within the U-plane buffer.

Within step 812 of FIG. 8, the multiplexer transmits control data from the C-plane buffer in fast C-plane transmission mode during the determined periods of silence within the user data. Process 800 continues in the manner described above until the end of the cordless telephone voice connection.

Figure 9:
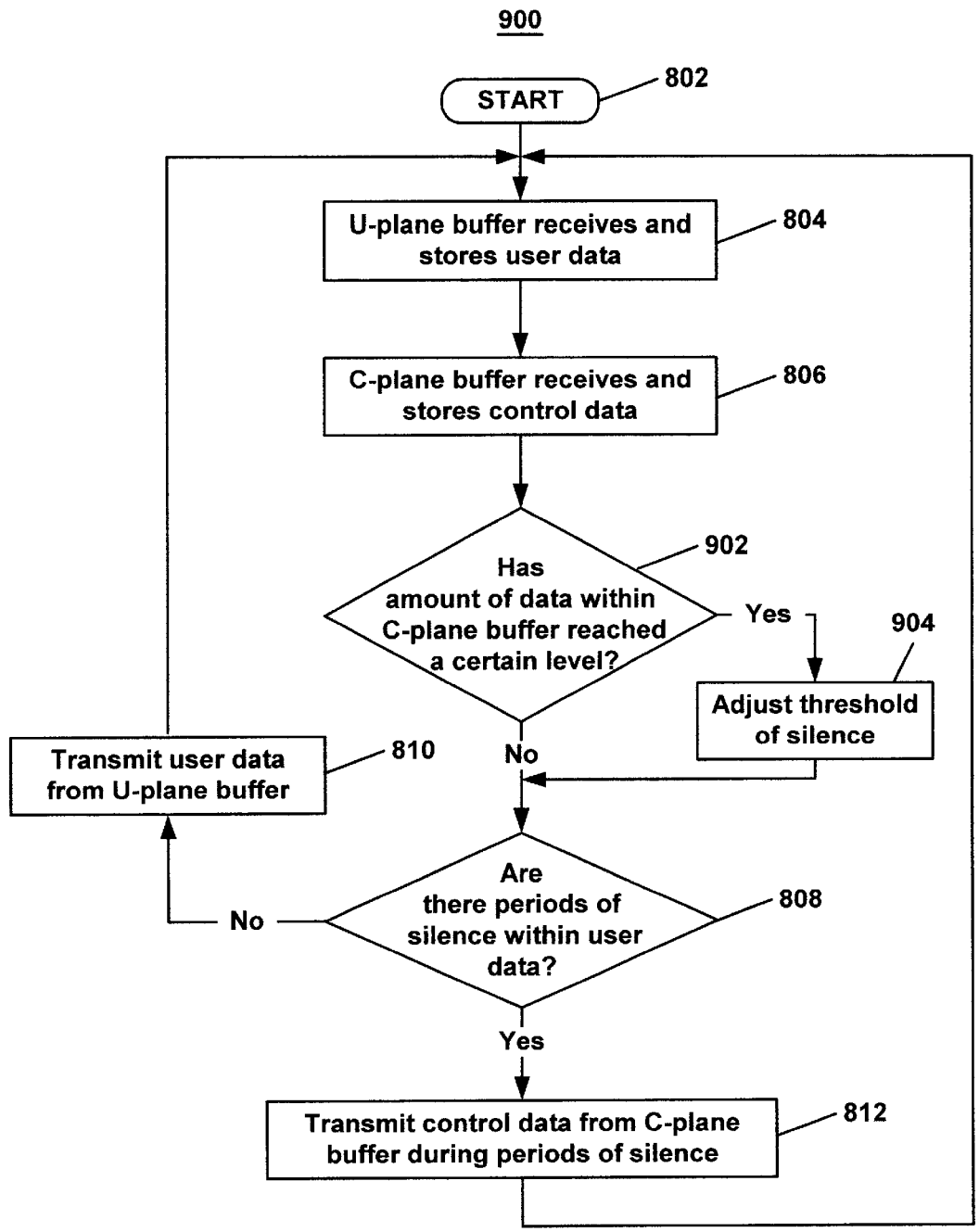
FIG. 9 is a flowchart of a for enabling fast C-plane transmission mode during cordless telephone voice connections within the DECT system method in accordance with another embodiment of the present invention.

FIG. 9 is a flowchart of a method 900 in accordance with another embodiment of the present invention for enabling fast C-plane transmission mode during cordless telephone voice connections within the DECT system. It should be appreciated that process 900 is very similar to process 800 of FIG. 8. The main difference between the two processes is that process 900 includes a silence detector circuit having an adjustable threshold of silence which directly corresponds to the amount of control data stored within C-plane buffer, as described above.

Specifically, during step 902 of FIG. 9, a silence detector determines if the amount of control data stored within the C-plane buffer has reached a specific storage capacity percentage. During step 902, if the storage capacity percentage has not reached the specific value, process 900 proceeds to step 808 of FIG. 9. If the storage capacity percentage has reached the specific value, process 900 proceeds to step 904.

Within step 904, the silence detector adjusts the threshold which it considers to be silence, as described above. It should be appreciated that the present invention is well suited for many different types of functions for adjusting the threshold of silence within the silence detector circuit.

Thus, the present invention improves the fast C-plane transmission mode during cordless telephone voice connections within the DECT system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A fast C-plane transmission mode circuit utilized within a cordless telephone handset of a digital enhanced cordless telecommunications (DECT) system, said circuit comprising:

a first buffer device coupled to receive and store control data utilized within said DECT system, said first buffer device outputs a capacity signal for indicating an amount of control data stored within said first buffer device;

a second buffer device coupled to receive and store user data utilized within said DECT system;

a multiplexer circuit coupled to said first and said second buffer devices to output said control data or said user data;

a silence detector circuit coupled to receive said user data, said silence detector circuit for generating an output signal when a period of silence is detected within said user data, wherein said output signal controls whether said multiplexer circuit outputs said control data or said user data, said silence detector circuit coupled to receive said capacity signal, said silence detector circuit generating said output signal to control said multiplexer circuit such that said amount of control data stored within said first buffer device remains below a predetermined limit; and a DECT channel buffer circuit for receiving said control data and said user data from said multiplexer circuit and for encoding said control data and said user data for transmission within said DECT system, wherein said control data is transmitted in accordance with a fast C-plane transmission mode.

2. The circuit as described in claim 1 wherein said user data is voice data.

3. The circuit as described in claim 1 wherein said user data is digital data.

4. The circuit as described in claim 1 wherein said DECT channel buffer circuit encodes said control data and said user data to be transmitted in a time division multiple access (TDMA) format.

5. The circuit as described in claim 1 wherein said silence detector circuit only generates said output signal when said period of silence is at least 10 milliseconds long.

6. The circuit as described in claim 1 wherein said DECT system is coupled to an integrated services digital network (ISDN) in an intermediate system configuration or an end system configuration.

7. The circuit as described in claim 1 wherein:

said silence detector circuit detects said period of silence when said user data falls below a silence threshold level and generates said output signal in response thereto; and said silence detector circuit adjusts said silence threshold level in accordance with said capacity signal such that said amount of control data stored in said first buffer device remains below said predetermined limit.

8. A D-channel circuit utilized within an integrated services digital network (ISDN) system, said circuit comprising:

a first buffer device coupled to receive and store control data utilized within said ISDN system, said first buffer device outputs a capacity signal for indicating an amount of control data stored within said first buffer device;

a second buffer device coupled to receive and store user data utilized within said ISDN system;

a multiplexer circuit coupled to said first and said second buffer devices to output said control data or said user data;

a silence detector circuit coupled to receive said user data, said silence detector circuit for generating an output signal when a period of silence is detected within said user data, wherein said output signal controls whether said multiplexer circuit outputs said control data or said user data, said silence detector circuit coupled to receive said capacity signal, said silence detector circuit generating said output signal to control said multiplexer circuit such that said amount of control data stored within said first buffer device remains below a predetermined limit; and an ISDN system channel buffer circuit for receiving said control data and said user data from said multiplexer circuit and for encoding said control data and said user data for transmission within said ISDN system.

9. The circuit as described in claim 8 wherein said user data is voice data.

10. The circuit as described in claim 8 wherein said user data is digital data.

11. The circuit as described in claim 8 wherein said silence detector circuit only generates said output signal when said period of silence is at least 10 milliseconds long.

12. The circuit as described in claim 8 wherein:

said silence detector circuit detects said period of silence when said user data falls below a silence threshold level and generates said output signal in response thereto; and said silence detector circuit adjusts said silence threshold level in accordance with said capacity signal such that said amount of control data stored in said first buffer device remains below said predetermined limit.

13. A method of transmitting control data in a fast C-plane transmission mode during cordless telephone voice connections within a DECT system, said method comprising the steps of:

receiving and storing control data utilized within said DECT system using a first buffer device;

receiving and storing user data utilized within said DECT system using a second buffer device;

outputting said control data or said user data using a multiplexer circuit coupled to receive said control data and said user data from said first and said second buffer devices;

outputting a capacity signal indicating an amount of control data stored within said first buffer device, said capacity signal output by said first buffer device;

detecting a period of silence within said user data using a silence detector circuit coupled to receive said user data;

generating an output signal in response to said period of silence, wherein said output signal controls whether said multiplexer circuit outputs said control data or said user data, said output signal generated by said silence detector;

generating said output signal to control said multiplexer circuit such that said amount of control data stored within said first buffer device remains below a predetermined limit, said output signal generated by said silence detector circuit coupled to receive said capacity signal;

encoding said control data and said user data for transmission within said DECT system using a DECT channel buffer circuit coupled to receive said control data and said user data from said multiplexer circuit; and transmitting said control data in accordance with a fast C-plane transmission mode using said DECT channel buffer circuit.

14. The method as described in claim 13 wherein said control data and said user data are transmitted in a time division multiple access (TDMA) format using said DECT channel buffer circuit.

15. The method as described in claim 13 wherein said user data is voice data.

16. The method as described in claim 13 wherein said user data is digital data.

17. The method as described in claim 13 wherein said silence detector circuit only generates said output signal when said period of silence is at least 10 milliseconds long.

18. The method as described in claim 13 wherein said DECT system is coupled to an ISDN in an intermediate system configuration or an end system configuration.

19. The method as described in claim 13 wherein said period of silence is detected when said user data falls below a silence threshold level using said silence detector circuit.

20. The method as described in claim 19 further comprising the step of adjusting said silence threshold level in accordance with said capacity signal such that said amount of control data stored within said first buffer device remains below said predetermined limit, said silence threshold level adjusted by said silence detector circuit.

* * * * *